United States Patent [19]
Cantrill et al.

[11] Patent Number: 5,551,859
[45] Date of Patent: Sep. 3, 1996

[54] PARTICULATOR

[75] Inventors: James E. Cantrill, Acton; Thomas R. Doyle, Leominster, both of Mass.

[73] Assignee: Novacor Chemicals (International) S.A., Fribourg, Switzerland

[21] Appl. No.: 94,309

[22] Filed: Jul. 19, 1993

[51] Int. Cl.$^6$ .................... C08F 2/00; B01F 3/00
[52] U.S. Cl. .............. 425/317; 366/305; 422/134; 422/135; 422/136; 422/225
[58] Field of Search .................... 422/131, 134, 422/135, 136, 137, 225; 366/302, 305; 425/317

[56] References Cited

U.S. PATENT DOCUMENTS

| | | | |
|---|---|---|---|
| 2,694,692 | 11/1954 | Amos et al. | 525/300 |
| 3,658,946 | 4/1972 | Bronstert et al. | 525/53 |
| 3,660,535 | 5/1972 | Finch et al. | 525/53 |
| 3,709,664 | 1/1973 | Krekeler et al. | 422/225 |
| 3,903,202 | 9/1975 | Carter et al. | 525/53 |
| 4,007,234 | 2/1977 | Schuddemage et al. | 525/24 |
| 4,198,383 | 4/1980 | Konsetov et al. | 422/134 |
| 4,857,587 | 8/1989 | Sosa et al. | 525/53 |
| 4,861,827 | 8/1989 | Sosa et al. | 525/54 |
| 4,999,015 | 3/1991 | DeMaris | 366/302 |
| 5,210,132 | 5/1993 | Matsubara et al. | 525/53 |
| 5,278,253 | 1/1994 | Baumgartner et al. | 525/316 |
| 5,340,891 | 8/1994 | Imamura et al. | 526/88 |

FOREIGN PATENT DOCUMENTS 832523  1/1970  Canada.

OTHER PUBLICATIONS

Kirk–Othmer, *Encyclopedia of Chemical Technology*, 1983, vol. 21, pp. 823–826.

*Primary Examiner*—James P. Mackey
*Attorney, Agent, or Firm*—Kenneth H. Johnson

[57] ABSTRACT

The present invention provides in a bulk polymerization reactor chain suitable for polymerizing a syrup of one or more monomers having dissolved therein one or more rubbers the improvement comprising a uniform shear field device. During polymerization at least a portion of the syrup polymerized to from 4 to 95% conversion passes through the uniform shear field device to produce at least a portion of a syrup having a rubber particle size more closely controlled than currently possible using a conventional reactor chain without a uniform shear field device.

9 Claims, 1 Drawing Sheet

PARTICULATOR

FIELD OF THE INVENTION

The present invention relates to a process to improve the properties or balance of properties of impact modified thermoplastic resins. More particularly, the present invention relates to a process that applies a uniform shear field to create or alter a dispersed rubber-like composite phase in a syrup comprising a continuous resin phase.

BACKGROUND OF THE INVENTION

The field of the manufacture of impact modified plastics is relatively old and the current industrial processes for their manufacture are fairly well known. According to conventional technology typically a solution of rubber, typically comprising 1 to about 20, preferably from 3 to 12 weight %, most preferably 4 to 10 weight % of rubber dissolved in one or more monomers is polymerized in a first stage reactor under mechanical agitation. Whether the polymerization occurs in a batch, stirred plug flow or continuous stirred tank reactors, almost all prior art and disclosures clearly teach that the particle size, particle size distribution and morphology of the dispersed rubber-like composite phase of the final product is largely determined during particulation in the early part of the process.

Particulation is the generic term used to describe the formation of the dispersed rubber-like composite phase regardless of its mechanism.

In the production of high impact polystyrene in a batch process or in a stirred plug flow reactor, the rubber-like composite phase is the continuous phase and the resin phase (monomer/resulting polymer phase) is dispersed. Typically, in conventional processes, as the polymerization proceeds in time with a batch reactor or in space with a stirred plug flow reactor, at some point between 5 and 20% conversion the system undergoes particulation by phase inversion under the application of a shear field generated by mechanical agitation. That is the rubber-like composite phase becomes the dispersed phase and the resin phase becomes the continuous phase. This does not happen instantaneously but occurs over a considerable period of time or space, typically from 20 to 50 minutes or reactor space which produces 2 to 8% conversion. That is the rubber-like composite phase and resin phase become co-continuous for a period of time or space before the particulation process is complete.

The ternary phase diagram of the styrene-polystyrenepolybutadiene system has been well studied and is well known. For example, the phase diagram and what happens during the polymerization of high impact polystyrene is discussed in Kirk-Othmer Encyclopedia of Chemical Technology published in 1983, Volume 21, pages 823 through 826.

In the production of high impact polystyrene in a continuous stirred tank reactor (CSTR) the rubber phase is particulated by the mechanism of dispersion. That is the rubber or rubber-like composite phase is dispersed in a CSTR that is operated with a continuous resin phase.

The distinction between rubber phase and rubber-like composite phase used in this document is as follows: The rubber phase is simply rubber dissolved in one or more monomers, while the rubber-like composite phase refers to rubber that has been modified by reaction with one or more monomers during polymerization. That is during polymerization polymer chains containing one or more monomers is grafted to the rubber molecules. In addition to graft copolymer, the rubber-like composite phase may contain occluded polymer. Occluded polymer is not grafted to the rubber molecules and resides within the rubber-like composite phase.

According to conventional wisdom the polymer chemist has a limited degree of freedom concerning the process of particulation in the manufacture of impact modified thermoplastic resins. That is particulation is limited to the region of phase inversion in a batch process and stirred plug flow reactors or at the point of dispersion in CSTR's. It is impossible to precisely control particulation in batch or plug flow reactors since it occurs over a period of time or a region of reactor space. In a CSTR particulation by dispersion occurs almost instantaneously, but due to the dynamics of the system the time the particles spend in the reactor is described by an exponential distribution. That is some particles exit the reactor shortly after forming while others may reside much longer. Furthermore, in a CSTR it is difficult, if not impossible to ensure that each unit volume of the reactants under goes the same or comparable shear history. As a result the particle size distribution of the dispersed rubber-like composite phase is typically broadest when formed in a CSTR.

Particle size, particle size distribution and morphology contribute to a number of properties of the product including impact resistance, gloss and translucency. Unfortunately, generally to maximize one property tends to reduce one or more of the other properties of the final polymer. There have been some attempts to overcome these deficiencies by blending resins having different particle sizes. Such an approach is expensive as it requires passing a melt blend of the resins through an extruder. Additionally, the properties of a blend may be lower than that expected from the weighted numerical average of the properties of each of the components in the blend.

The following is representative of the state of the art in the polymerization of impact modified thermoplastics. Almost all techniques largely determine the final particle size of the rubber-like composite phase at the point of phase inversion or dispersion.

U.S. Pat. No. 2,694,692 issued Nov. 16, 1954, assigned to The Dow Chemical Company discloses the desirability and criticality of agitation during the early stages of polymerization of impact modified thermoplastic polymers.

U.S. Pat. No. 3,658,946 issued Apr. 25, 1972, assigned to Badische Aniline-& Soda-Fabrik Aktiengesellschaft (BASF) discloses particle size and distribution of impact modified thermoplastics may be controlled by varying the stirrer speed or shear during the early part of the reaction.

U.S. Pat. No. 3,660,535 issued May 2, 1972 assigned to the Dow Chemical Company discloses stirring or mechanical agitation during the initial stages of polymerization to create the required particle size distribution in the polymerization of an impact modified thermoplastic.

U.S. Pat. No. 3,903,202 issued Sep. 2, 1975 assigned to Monsanto Company teaches dispersing under mechanical agitation a monomer syrup containing rubber into a partially polymerized monomer, during the early stages of polymerization to create the required dispersion of impact modifier throughout the resin phase.

U.S. Pat. Nos. 4,857,587 and 4,861,827 issued Aug. 15 and 29, 1989 respectively, assigned to Fina Technology Inc. discloses the use of mechanical agitation during the early stages of the polymerization of an impact modified thermoplastic to create the required dispersion of rubber throughout the continuous resin phase.

There are three patents which Applicants are aware of which state the control of shear is important in the process.

Canadian Patent 832,523 issued Jan. 20, 1970 to Shell Internationale Research Maatschappij N.V., teaches HIPS containing a bimodal particle size distribution. The HIPS comprises from 70 to 99 weight % of polystyrene and from 1 to 30 weight % of a dispersed rubber phase having a particle size distribution so that from 70 to 97% of the particles have a diameter from 1 to 3 microns and from 30 to 3% of the particles have a diameter from 5 to 25 microns.

The Shell patent teaches controlling agitation or shear during the early stages of polymerization to obtain the required particle distribution. The Shell patent teaches using the shear of a conventional process.

It is interesting to note that while the Shell patent also clearly contemplates blending impact modified polystyrenes (page 4, lines 10–15) and interpolymerizing styrene monomer containing two distinct types of rubber to obtain the required particle size distribution, it does not teach or disclose blending syrups having different particle size distributions and completing the polymerization to directly yield a product having a bi-modal particle size distribution.

U.S. Pat. No. 4,007,234, assigned to Hoechst A. G., issued Feb. 8, 1977 discloses a process for controlling the particle size distribution in high impact styrene copolymers modified with ethylene-propylene rubbers. The polymer is prepared using a mass/mass or mass/suspension process with high shear in the prepolymerizer. The resulting polymer is then subjected to a two stage shearing action. A catalyst is introduced into the polymer prior to or during the second shearing to crosslink the rubber particles and to maintain particle size. While the Hoechst patent teaches shearing the polymer, it does not disclose shearing the syrup as required in the present invention. Additionally, the rubber used in the Hoechst process is EPDM which is not used in the present invention.

U.S. Pat. No. 5,210,132 assigned to the Mitsui Toatsu Chemicals, Inc. issued May 11, 1993 discloses a process which forms a dispersed rubber-like composite phase in a continuous resin phase. The particulated syrup is then subjected to shear in a device having at least three shearing blades or rotors. The shearing rotors and stators are coaxial and have comb like cuts at interposing ends or sections to form a multilayer structure. The result is that the Mitsui patent teaches a multi-zone shear field having at least three different shear rates. The shear field in the device of the Mitsui patent will vary radially outward from the centre of the cylindrical comb like rotor as a function of the distance from the centre of the rotor. In the cylindrical rotor and stator of the present invention there is only a single shear zone having a closely controlled shear field. The essential features of the Mitsui patent teaches away from the subject matter of the present invention.

None of the above art suggests or discloses any particular type of device to treat a syrup of resin and rubber-like composite phases to a relatively uniform shear field. In all of the references apart from the Hoechst and Mitsui patents, particle sizing takes place within the first reactor or prepolymerizer. The Hoechst patent discloses using an extruder subsequent to substantially polymerizing the syrup. Furthermore the Hoechst patent requires the use of a rubber polymer which does not crosslink at the conversions at which a typical vinyl containing rubber (e.g. polybutadiene and butadiene copolymers) would be crosslinked. The Mitsui patent discloses the use of a multi-zone nonuniform shear device.

To overcome one of the drawbacks of the prior art there is a need for a device for applying a relatively uniform controlled shear field to a syrup of resin and rubber-like composite phases. Such a device would make it possible to particulate a post inversion metastable syrup and to control or alter the particle size of particulated syrup as the shear exerted on the syrup could be more uniformly controlled.

Accordingly, the present invention seeks to provide a uniform shear field generating device useful in an industrial process to control the particulation of a post inversion metastable syrup or to alter the particle size (e.g. size-the volume average diameter) of at least a portion of the particles within a particulated syrup comprising a resin phase and a dispersed rubber-like composite phase.

As used in this specification the following terms have the following meanings:

"Dispersion" means a system of two or more phases in which one phase forms a continuous phase and the other phases are dispersed as small droplets or particles through the continuous phase;

"Resin phase" means a solution of polymer resin dissolved in one or more monomers or the polymer itself;

"Rubber phase" means an uncrosslinked rubber dissolved in one or more monomers, or the rubber itself;

"Rubber-like composite phase" means a composite of a rubber phase as defined above and one or more resin phases as defined above said composite may contain resin polymers occluded by or grafted onto the rubber polymers;

"Dispersed rubber-like composite phase" means a rubber-like composite phase dispersed throughout a continuous resin phase;

"Post inversion metastable syrup" or "metastable syrup" means a syrup polymerized under low shear conditions past the normal phase inversion region described earlier for batch processes and plug flow reactors and consists of a rubber-like composite phase that is continuous or co-continuous with resin phase in a metastable free energy state [e.g. Gibbs or Helmholtz];

"Particulation" a term used to describe the formation of a dispersed rubber-like composite phase regardless of its mechanism;

"Dispersing" or "phase dispersion" or "particulation by dispersion" means the formation of a dispersed rubber-like composite phase in a continuous resin phase by dispersing with mechanical agitation a rubber phase or continuous rubber-like composite phase into a tank which has a continuous resin phase. Typically, this process occurs in a continuous stirred tank reactor (CSTR);

"Inverting" "inversion" or "phase inversion" or "particulation by inversion" means the formation of a dispersed rubber-like composite phase in a continuous resin phase from a syrup which has a continuous or co-continuous rubber-like composite phase.

"Rapid phase inversion" or "step like phase inversion" (as opposed to "inverting" or "inversion" or "phase inversion" or "particulation by inversion") means the particulation of a post inversion metastable syrup in a relatively short time or small reactor volume to a stable syrup consisting of a dispersed rubber-like composite phase and a continuous resin phase;

"Low shear" means a shear field which is not sufficient to invert a metastable syrup. Low shear fields occur in static mixer reactors or during mechanical agitation of anchor or turbine agitators or other agitators operated at low rates of rotation. Typically with driven agitators the rates of rotations are less than 15, preferably less than 10 RPM's most preferably as low as possible. Of course one skilled in the art will be aware that the degree of agitation will depend on reactor configuration and appropriate speeds can be determined by routine experimentation after reading this specification.

SUMMARY OF THE INVENTION

According to one aspect of present invention there is provided, a device comprising:
(i) a chamber, preferably closed, having a circular cross section perpendicular to its longitudinal axis and at least one input port and at least one output port;
(ii) a cylinder within said chamber, said cylinder having a circular cross section perpendicular to its longitudinal axis, a surface closely conforming to the internal surface of said chamber and occupying substantially all the space within said chamber except for a closely controlled clearance between the internal surface of the chamber and the external surface of the cylinder; and
(iii) means for rotating at least one of said chamber and said cylinder relative to each other.

According to a further aspect of the present invention there is provided an apparatus comprising in cooperating arrangement:
(i) one or more reactors suitable for bulk or solution polymerization of a syrup comprising one or more monomers having dissolved therein one or more rubbers; and
(ii) one or more uniform shear field generators, provided that said one or more uniform shear field generators are located so as to treat at least a portion of said syrup which has been polymerized to from 4 to 95% conversion.

DETAILED DESCRIPTION

Figure 1:
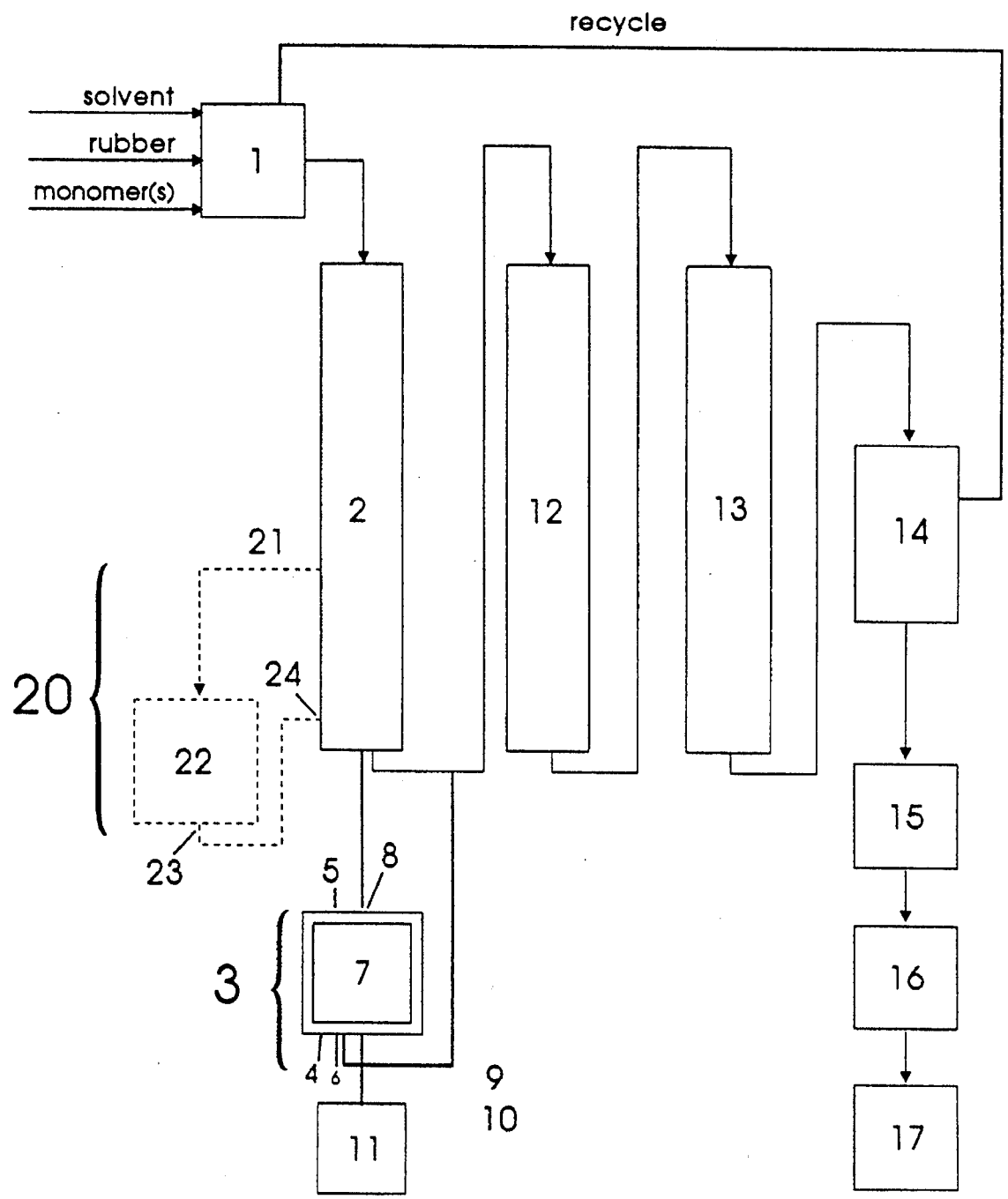
FIG. 1 is a schematic drawing of a plant for the production of an impact modified polymer such as high impact polystyrene (HIPS) by a continuous mass polymerization using a sequence of reactors.

The impact modified polymers which may be prepared in accordance with the present invention include high impact polystyrene (HIPS), acrylonitrile butadiene styrene polymers (ABS) and methyl methacrylate butadiene styrene polymers (MBS). The monomers useful in accordance with the present invention for the formation of the thermoplastic polymer may be selected from the group consisting of $C_{8-12}$ vinyl aromatic monomers which are unsubstituted or substituted by a $C_{1-4}$ alkyl radical, $C_{1-8}$ alkyl esters of acrylic and methacrylic acid, maleic anhydride, acrylonitrile and methacrylonitrile.

Suitable $C_{8-12}$ vinyl aromatic monomers which are unsubstituted or substituted by a $C_{1-4}$ alkyl radical include styrene, α-methyl styrene, p-methyl styrene, and t-butyl styrene. Useful $C_{1-8}$ alkyl esters of acrylic and methacrylic acid ,include methyl methacrylate, ethyl methacrylate, methyl acrylate, ethyl acrylate and ethylhexyl acrylate.

The resin component in the impact modified thermoplastic may comprise a co- or homo-polymer of one or more $C_{8-12}$ vinyl aromatic monomers which are unsubstituted or substituted by a $C_{1-4}$ alkyl radical. A suitable resin includes polystyrene. However, the resin may be a copolymer comprising from 5 to 95, preferably from 50 to 90 weight % of one or more $C_{8-12}$ vinyl aromatic monomers and from 95 to 5, preferably from 50 to 10 weight % of one or more monomers selected from the group consisting of $C_{1-4}$ alkyl esters of acrylic and methacrylic acids, and acrylonitrile and methacrylonitrile. Typically such polymers are copolymers of styrene and one or more monomers selected from the group consisting of acrylonitrile, methacrylonitrile, α-methylstyrene, methyl acrylate, ethyl acrylate, methyl methacrylate, ethyl methacrylate, butyl acrylate, butyl methacrylate, ethylhexyl acrylate, and maleic anhydride.

When finally finished the resin polymers should have a number average molecular weight (Mw) greater than about 65,000 preferably greater than 70,000 for styrene containing polymers and a number average molecular weight of greater than 30,000 for the predominantly ester polymers.

Random rubber polymers which may be used as impact modifiers in the present invention will typically have a (weight average) molecular weight (Mw) of greater than about 100,000, preferably greater than 200,000. Block rubber copolymers have significantly lower molecular weight, typically greater than 50,000 (Mw). The rubbers may be selected from the group consisting of:
(i) co- or homopolymers of $C_{4-6}$ conjugated diolefins which are unsubstituted or substituted by a halogen atom, preferably a chlorine or bromine atom;
(ii) random, block, linear, star and tapered copolymers comprising from 10 to 80 weight % of one or more $C_{8-12}$ vinyl aromatic monomers which are unsubstituted or substituted by a $C_{1-4}$ alkyl radical, from 20 to 90 weight % of one or more $C_{4-6}$ conjugated diolefins; and
(iii) copolymers comprising from 1 to 50 weight % of acrylonitrile or methacrylonitrile and from 50 to 99 weight % of one or more $C_{4-6}$ conjugated diolefins.

Suitable polymers which are co or homopolymers of $C_{4-6}$ conjugated diolefins include homopolymers of butadiene and copolymers of butadiene and styrene (styrene butadiene rubbers or SBR) or copolymers of butadiene and acrylonitrile (nitrile rubbers). Preferably the polymer will be a homopolymer of butadiene. Generally such homopolymers have a level of stereospecificity. The selection of the degree of stereospecificity will depend to some extent upon the properties required in the final product. Some polybutadienes contain over 90, most preferably over 95 weight % of monomer in the cis configuration. Such a type of polymer is commercially available from Polysar Rubber Corporation under the trademark TAKTENE® 1202. The polybutadiene may contain a lower amount, typically from 50 to 65, most preferably about 50 to 60 weight % of monomer in the cis configuration such as polymers which are available from Firestone under the trademark DIENE®55 or from the Polysar Rubber Corporation under the trademark TAKTENE®550.

Suitable rubbery polymers may comprise: from 10 to 80, preferably from 20 to 50 weight % of one or more $C_{8-12}$ vinyl aromatic monomers which are unsubstituted or substituted by a $C_{1-4}$ alkyl radical, from 20 to 90, preferably from 50 to 80, weight % of one or more $C_{4-6}$ conjugated diolefins. Such rubber polymers may be random or block such as linear block, star block or tapered block polymers.

Random copolymers having the above composition are the commercially available styrene butadiene rubbers (SBR). A number of block copolymers are available from Shell under the trademark KRATON®.

The rubbery polymer may comprise from 1 to 50, preferably from 5 to 35 weight % of acrylonitrile or methacrylonitrile and from 50 to 99, preferably from 95 to 65 weight % of one or more $C_{4-6}$ conjugated diolefins.

The above polymers are the commercially available nitrile rubbers available from Polysar Rubber Corporation under the trademark KRYNAC® and from Bayer AG under the trademark PERBUNAN®.

It should be kept in mind that the rubber should be soluble in one or more of the monomers of the thermoplastic or the diluent or solvent for the monomers. The solubility of the above rubbers in various monomers and/or diluents or solvents may be easily determined by non-inventive routine testing.

Typically, from about 1 to 20, preferably from 3 to 12, most preferably from about 4 to 10 weight % of the rubber is dissolved in the monomer or a mixture of monomers to form a syrup. The syrup is then polymerized, under low shear using no or low mechanical agitation conditions, either thermally or in the presence of one or more initiators to form a metastable syrup. Typically, in accordance with the invention, the syrup is polymerized to a degree of conversion of greater than 5, preferably from 10 to 75 most preferably from about 15 to 65%.

The metastable syrup may also be prepared by adding to a partially polymerized mixture of monomers and uncrosslinked rubber a rubber concentrate comprising from 10 to 30 weight % of one or more uncrosslinked rubbery polymers in a fluid medium comprising one or more members selected from the group consisting of monomers, solvent, process oil and liquid plasticizers, and partially polymerizing the resulting mixture under low shear so that the rubbery phase forms a metastable continuous or co-continuous phase and optionally, in a further separate step diluting the partially polymerized mixture with one or more additional monomers.

Metastable syrups may be handled industrially provided there is not a significant shear on the syrup to cause it to particulate. The syrup may be handled using low shear methods such as low shear pumps, gravity feeds or vacuum and pressure techniques.

A reactor having low mechanical shear such as a plug flow reactor may be used to produce a metastable syrup. The plug flow reactor may have a length to diameter (D/L) ratio greater than 3:1, preferably between 5:1 and 15:1, most preferably about 9:1. Such reactors may contain an anchor or wiper type stirrer to provide for movement of the syrup for heat transfer requirements but should not provide any high shear agitation. Upon being subjected to the process of the present invention the rubber phase will become a dispersed rubber-like composite phase distributed throughout the continuous resin phase as particles.

In accordance with a further embodiment of the present invention a uniform shear field generator may be used in cooperation with one or a chain or two or more batch or plug flow reactors which may have conventional or low mechanical agitation. Typically, from about 1 to 20, most preferably from about 3 to 12, most preferably from 4 to 10 weight % of the rubber is dissolved in the monomer or a mixture of monomers to form a syrup. The initial syrup is polymerized in a batch or plug flow process, under low mechanical agitation conditions, either thermally or in the presence of one or more initiators. Typical polymerization temperatures (in the reactors) range from 80° to 180°, more typically 90° to 170° C. Under these conditions the syrup inverts and the dispersed phase has a large particle size distribution. The resulting particles tend to have a volume average diameter of greater than 6, preferably greater than 6.5 micrometers. The resulting large particle syrup is then treated with a uniform shear field generator to reduce the volume average particle diameter. In accordance with this aspect of the invention, the syrup is polymerized to a conversion between 1% above the point at which the syrup has inverted and the point at which the rubber has become crosslinked to form a network. Preferably the degree of conversion is between 5 and 75% before the syrup is treated in accordance with the present invention.

The initial plug flow reactor may be replaced with a continuous stirred tank reactor (CSTR). A rubber solution or partially polymerized syrup below its inversion point is fed to the continuous stirred tank reactor (CSTR) operated at an equilibrium conversion sufficiently high so that the said rubber solution or partially polymerised syrup forms a dispersed rubber-like composite phase. The resulting syrup may then be passed through a or a chain of reactors having one or more cooperating uniform shear generator(s).

The breadth of the particle size distribution can be indicated by comparing the diameter at which the cumulative fraction of particle is 0.25 with the diameter at which the cumulative fraction of particles is 0.75. The ratio of the diameter at 0.75 cumulative fraction to the diameter at 0.25 cumulative fraction is often used to indicate the breadth of the distribution.

A useful indication of particle size is reflected by the volume average particle diameter. The volume average particle diameter is given by the ratio of the fourth moment of the particle size distribution to the third moment of the particle size distribution.

$$\text{Volume Average diameter} = \frac{\Sigma n_i d_i^4}{\Sigma n_i d_i^3}$$

wherein $n_i$ is the number of all particles having diameter $d_i$ summed over all particle diameters.

Usually, but not invariably the dispersed particles have a log normal distribution and the density of the particle size distribution is given by:

$$p(x) = \frac{1}{\sqrt{2\pi}\ \sigma x} \exp\left(-0.5\left(\frac{\ln x - \mu}{\sigma}\right)^2\right)$$

where p(x) is the particle size distribution density at diameter x, µ is a parameter indicating the location of the distribution, and σ is a parameter indicating the spread or breadth of the distribution. In cases where the particle size distribution is log normal these two parameters, µ and σ, uniquely determine the distribution.

A useful (final) particle size distribution may be characterized as a particle size distribution having a volume average particle diameter from 0.01 to 15. Preferably for high impact polystyrene type systems the volume average particle diameter will be from 0.5 to 15 micrometers. Preferably for the ABS, MBS and ester (e.g. acrylate and methacrylate) resin type systems the volume average particle diameter will be from 0.05 to 5 micrometers. As noted above there are a number of bi- and poly- modal particle size distributions which give useful properties. Generally useful bi- or poly- modal particle size distribution comprises from 100 to about 40% of small particles from about 0 to about 60% of medium sized particles and from 0 to 20 weight % of particles outside the specified sizes for small and medium particles. The ratio of diameters of small to medium particles may range from 1:1.15 to 1:20 preferably from 1:1.3 to 1:6.

The reduction of the volume average diameter of a syrup containing a relatively uniform large particle size should be at least 20%, most preferably not less than 30%. The resulting particle size distribution may be within that specified above.

The syrup should pass through the uniform shear field device or generator before the rubber becomes crosslinked. Once the desired particle size distribution has been obtained the syrup should not be subjected to shear conditions prior to crosslinking which will significantly alter the obtained particle size distribution. Typically, crosslinking of the rubber does not start to occur until the conversion is well above 75%. The degree of crosslinking of the rubber may be measured by the swelling index, determined using the test given below. The uniform shear field generator or device should be located in the reactor chain so as to treat the syrup either after particle formation or after the conversion is such that the syrup has become metastable. Depending on the degree of mechanical agitation and the amount of rubber present in the syrup this may be at any time after about 4% conversion. However, in the embodiment of making large particles and reducing the particle size it is believed advantageous to carry out the treatment after the conversion has reached a stage where the effects of diffusion of occluded resin phase after treatment will minimize any further reduction in particle size after treatment. Typically the uniform shear field generator will be located to treat syrup having a conversion from 5 to 75%.

The device of one aspect of the present invention is a controlled shear device or a Couette shear field generator. The device comprise a stator and a rotor, most preferably with an adjustable gap there between, and a controlled or determined path length through which the syrup must flow.

The device may comprise a tubular stator member, such as a straight or tapered pipe. Inside the tubular member is a closed cylinder or cone which is the rotor. Preferably the rotor is movable within the stator to control either or both the clearance between the rotor and stator and the path length over which the fluid is subjected to shear. More particularly the device may be a Couette fluid shear field generator comprising:

(i) a chamber having a circular cross section perpendicular to its longitudinal axis and at least one input port and at least one output port;

(ii) a cylinder within said chamber, said cylinder having a circular cross section perpendicular to its longitudinal axis, a surface closely conforming to the internal surface of said chamber and occupying substantially all the space within said chamber except for a closely controlled clearance between the internal surface of the chamber and the external surface of the cylinder; and (iii) means for rotating at least one of said chamber and cylinder relative to each other.

Preferably the cylinder is a rotor and the chamber is closed and a stator. Preferably a drive means passes through one end of said chamber and to rotate the cylinder relative to the chamber.

The internal shape of the chamber and the external shape of the rotor conform. Suitable shapes for the chamber and rotor include cylindrical, frustro-conical (tapered cylindrical), and conical. Spherical, hemi-spherical and parabolic shapes would likely be useful but may be more difficult to use in plant operations. A special shape would be a plate shaped stator or chamber and a plate shaped rotor. A further special configuration is a plate shaped stator with a conical shaped rotor or conical stator with plate shaped rotor.

Suitable ratios of dimensions for the shear field generator will depend upon the required residence time, the diameter of the rotor and the chamber and the speed of rotation. Clearance between the chamber wall and the surface of the rotor for a cylindrical chamber and rotor may be defined in terms of the ratio of the radius of the rotor (rr) to the radius of the chamber (rc). Typical ratios range from 0.999 to 0.750, preferably from 0.993 to 0.875. The ratio of the length to the diameter of the chamber (L/D ratio) should be greater than 0.25:1, preferably between 0.5:1 to 10:1 and most preferably between 0.5:1 to 3:1. The input and output ports should be preferably located at each end of the chamber.

A relatively uniform controlled shear field may also be provided by flowing said syrup through a device comprising a closed chamber having a circular cross section perpendicular to its longitudinal axis, a continuous side wall and a conical projection along its longitudinal axis, said conical projection having a low apical angle, a planar end perpendicular to the longitudinal axis of said chamber and placed adjacent the apex of said conical projection and means for rotating said conical projection and said plate relative to each other. The apical angle is less than, 7 preferably less than 4, most preferably less than 2°. The gap between the tip of the cone and the plate should be minimal.

The free volume within the device should be less than 10%, preferably less than 5%, most preferably less than 3% of the volume of the reactors upstream of the device. As a result residence time of the syrup as it flows through the device should be low. Typically the residence time should be less than 10 minutes, preferably less than 5 minutes, most preferably less than 3 minutes. Of course, the residence time will depend on the free volume within the chamber and the flow rate through the controlled shear (field) device. Typically the conversion of the monomers will be less than 5% preferably less than 2%, most preferably less than 1% within the controlled shear field device.

Typical shear rates range from about 2 to 2000 sec.$^{-1}$, preferably from about 4 to 1000 sec.$^{-1}$.

The rotor should be attached to a drive means capable of driving the rotor at speeds up to several hundred RPM's. For most operations the rotor should be capable of operating at speeds between about 5 and about 500, preferably from 10 to 250 RPM's.

In view of the relatively short residence time of the syrup as it passes through the device, the device of present invention provides for a process in which there is a very short transition time between grades of impact modified thermoplastic having the same level of rubber but a different particle size distribution.

When two or more controlled shear field devices are used in a conjunction with one or more reactors the syrup may be divided into a number of streams and each stream may be individually treated and then two or more of the streams may be combined and further substantially polymerized. Such a procedure permits the formation of bi- or multi-modal particle size distributions within the syrup. Accordingly, it is possible to select or control the particle size distributions within the system to try to optimize the balance among several resin properties such as gloss and toughness.

When using the devices of the present invention it is possible to add additional resin monomers to the treated syrup (i.e. one in which there is a dispersed rubber-like composite phase). Suitable resin monomers have been discussed above.

The device of the present invention may also be used to extend the scope of utility of existing technology. Until the polymerization has progressed to such a degree to fix the particle size distribution of the dispersed rubber-like composite phase it is possible to further alter the particle size distribution. The device of the present invention may be used to lower or to alter the particle size distribution of the dispersed rubber-like composite phase prior to the crosslinking of the rubber. Typically in a low shear process the discontinuous rubber-like composite phase will have a volume average diameter of greater than 6, preferably greater than 6.5 micrometers (e.g. the particle size of the dispersed rubber-like composite phase (sometimes called the rubber particles) prior to treatment with the device of the present invention). Subsequent to treatment with the device of the present invention the volume average diameter of the dispersed rubber-like composite phase should be reduced by at least 20, more preferably at least 30%. The device of the present invention may be incorporated into existing plants at a location to treat syrups having a conversion less than about 95%, typically between 5 and 95%, more typically between 8 and 75%.

A reactor or a chain of reactors having low mechanical shear such as a plug flow reactor may be used to produce such a syrup. Upon inversion or dispersion the rubber phase will be distributed throughout the continuous resin phase as fairly large uniform particles.

Care should be taken in using the equipment of the present invention. Under extreme conditions of shear and pressure it is possible to form a post inversion metastable syrup (the rubber-like composite and resin phases are co-continuous) from a stable particulated one.

The crossover point between altering the volume average diameter of the dispersed phase and formation of a post inversion metastable syrup (departiculation) will depend on a number of factors including the type and configuration of equipment used, the degree of polymerization of the syrup and the viscosity of the syrup. While it is difficult to scale up from laboratory equipment to plant scale equipment the relative magnitudes of the shear on each side of the crossover point may be examined using a device capable of delivering high shear and pressure. Stable particulated syrup samples may be placed in such a device and each subjected to different shear rates and pressures. The resulting sample is then polymerized in a glass tube to completion and the product can be analyzed by the Test for Particulation and Transmission Electron Microscopy described in the Specific Embodiments. By observing the morphology of the sample and correlating it to shear rate and pressure, it is possible to define the conditions where the syrup will undergo departiculation (forming a post inversion metastable syrup in which the rubber phase is continuous or co-continuous with the resin phase). Generally the shear rates and pressure to cause a stable syrup to departiculate to a post inversion metastable syrup are quite high.

After an appropriate particle size has been obtained in the syrup, the syrup may be polymerized in a conventional manner. The morphology of the rubber-like composite phase particles in the resin phase will be fixed as the rubber becomes crosslinked. Typically the syrup will be passed through one or more reactors to raise the conversion to as close to complete as possible without degradation of the product and within the time limits of "normal" commercial processes for polymerization. Typically this conversion will be greater than 65% preferably from about 70 to about 90%. The syrup will then be fed to a preheater and devolatilized in a conventional manner. The devolatilized polymer may then be extruded as strands and chopped into pellets.

From an apparatus point of view the present invention provides a typical apparatus for the polymerization of impact modified polymers in cooperation with one or more devices to subject the syrup to a relatively uniform shear generating device. For the sake of simplicity the type of device useful in accordance with the present invention will be described in the context of devices used to make an impact modified polymer such as high impact polystyrene (HIPS) which will be described in relationship to FIG. 1 which is a schematic drawing of a plant for the polymerization of such an impact polymer using three reactors.

Typically in the polymerization of an impact modified polymer, up to about 20 weight %, preferably from about 3 to 12 weight %, most preferably from 4 to 10 weight %, of rubber, is dissolved in one or more monomers, and optionally solvent, in a dissolver tank 1. The solution of rubber in monomer and optionally solvent is then fed to a first reactor 2, in a series of, in this case three, horizontal or vertical reactors. The reactors upstream of the device may be either continuous stirred tank reactors (CSTR's) or plug flow reactors. The monomers are partially polymerized preferably under low shear (with no or very low agitation) to form either a post inversion metastable syrup in which the rubber-like composite and resin phases are continuous or co-continuous or a stable syrup in which the dispersed rubber-like composite phase particles are very large. The syrup leaves reactor 2, and all or part of the syrup passes through one or more Couette shear field generator(s) (particulator(s)) generally indicated at 3. While not shown in the drawings the syrup from reactor 2 may be passed to two or more particulators to generate a bi- or multi-modal particle size distribution.

The Couette shear field generator comprises a closed chamber 4 having ends 5 and 6, and a continuous smooth cylindrical surface about the longitudinal axis of the chamber and having within it a rotor which is a closed (e.g. not annular) cylinder 7 closely conforming to the shape of the chamber. The internal shape of the chamber and the external shape of the rotor conform. Suitable shapes for the chamber and rotor include cylindrical, frustro-conical (tapered cylindrical), and conical. Spherical, hemispherical and parabolic shapes would likely be useful but may be more difficult to use in plant operations. A special shape would be either a plate shaped stator with a conical shaped rotor or a conical stator with plate shaped rotor. The gap between the internal surface of the chamber 4 and the external surface of the cylinder 7 is small and closely controlled. Chamber 4 has an inlet 8 and an outlet 9. Drive means 10 passes through one of the closed ends, in this case 6, of chamber 4. The drive means is attached to a power means 11, such as an electric motor.

The syrup from reactor 2, and the particulator device then is transferred into downstream reactor 12 which may be either a CSTR or a plug flow reactor, where more of the resin phase is polymerized. While not shown in the drawings it would be possible to have all or part of the syrup leaving reactor 12 pass through one or more particulators.

The syrup from reactor 12 is then transferred to downstream reactor 13 which may be either a CSTR or plug flow reactor, where the resin phase is further polymerized. While not shown in the drawings it would be possible to have all or part of the syrup leaving reactor 13 pass through one or more particulators.

The syrup from reactor 13 then is passed to a devolatilizer 14. In the devolatilizer most of the residual monomer and solvent are removed from the syrup. The monomer and solvent are recycled.

The product then passes through a die plate 15, from which the product is extruded as strands. The strands pass through a cooling step 16. Typically the strands pass through baths of cooling water. The strands are then pelletized in a pelletizer 17.

As shown in the broken lines it would be possible to place a particulator 20, at a location other than the exit from the first reactor. For example reactor 2 could have an exit port 21, somewhere prior to the end of the reactor. The exit port 21 could be connected to inlet 22 of particulator 20. The syrup would pass through the particulator 20 and leave the particulator's outlet 23 and be returned to reactor 2 by an inlet port 24 which is down stream from outlet port 21. Additionally, the Couette field generator could be located at the exit of any reactor, provided the rubber had not crosslinked. A further alternative could be to place the Couette field shear generator immediately prior to the devolatilizer 14.

The Couette shear field generator may be used in a number of ways. A stream of post inversion metastable syrup or large particle size stable syrup could be split into two or more streams each of which could be treated to generate a particular particle size distribution. The streams could then be blended and the polymerization finished. This would permit the production of a product with a bi- or multi-modal particle size distribution for the dispersed rubber-like composite phase so that a number properties could be enhanced for example such as toughness and gloss.

It will be recognized that the above description is of one embodiment of the invention. Other configurations and applications for the present invention will be apparent to those skilled in the art.

EXAMPLES

The present invention will be illustrated by the following examples, which are not intended to limit the invention. In the examples, unless otherwise indicated parts means parts by weight and % means weight %.

Controlled shear device (type I):

For laboratory scale experiments a Couette shear field generating device (particulator) was custom made. The device contained a cylindrical chamber 6 inches deep and 2 inches in diameter (an L/D ratio of 3:1). The chamber had an external heating jacket with two ports to flow hot oil through, which were connected to a heating/circulating oil bath to provide temperature control. The top of the chamber was removable. A drive shaft passed through a seal in the top of the chamber. One end of the drive shaft was attachable to an electric motor and the other end was attachable to a cylindrical rotor. Several cylindrical rotors were machined for the device. The rotors essentially filled the chamber. The rotors were machined to provide the following wall clearances between the surface of the rotor and the surface of the chamber: 0.03125, 0.06250, 0.1250 and 0.2500 inches. When the rotors were installed in the device the following volumes were obtained: 19.0, 37.0, 72.4, 135.0 mL, respectively. At the bottom of the chamber was an inlet port to flow syrup into the chamber and at the top of the chamber was an outlet port to permit the flow of treated syrup out of the device. The shear rate the syrup was exposed to in the device could be changed by varying the rotor rpm or the rotor gap. Syrup temperatures were measured at the inlet and outlet of the device and recorded. The entire device was made from stainless steel.

Controlled shear device (type II):

For laboratory scale experiments a Couette shear field generating device (particulator) was custom made. The device contained a cylindrical chamber 2 inches deep and 2 inches in diameter (an L/D ratio of 1:1). The chamber had an external heating jacket with two ports to flow hot oil through, which were connected to a heating/circulating oil bath to provide temperature control. The top of the chamber was removable. A drive shaft passed through a seal in the top of the chamber. One end of the drive shaft was attachable to an electric motor and the other end was attachable to a cylindrical rotor. Several cylindrical rotors were machined for the device. The rotors essentially filled the chamber. The rotors were machined to provide the following wall clearances between the surface of the rotor and the surface of the chamber: 0.03125, 0.06250, 0.1250 and 0.2500 inches. When the rotors were installed in the device the following volumes are obtained: 6.4, 12.3, 24.1, 45.1 mL, respectively. At the bottom of the chamber was an inlet port to flow syrup into the chamber and at the top of the chamber was an outlet port to permit the flow of treated syrup out of the device. The shear rate the syrup was exposed to in the device could be changed by varying the rotor rpm or the rotor gap. Syrup temperatures were measured at the inlet and outlet of the device and recorded. The entire device was made from stainless steel.

Continuous Stirred tank reactor (CSTR):

The CSTR was a glass 1.0 L vessel equipped with a bottom outlet port. The reactor has a external heating jacket with ports to flow hot oil through and was connected to a heating circulating oil bath to provide temperature control. The top of the reactor was removable and equipped for mechanical agitation. A drive shaft passed through a seal in the top of the reactor. One end of the drive shaft was attachable to an electric motor and the other end was attachable to an agitator. Batch (syrup) temperature was measured in the middle of the reactor and recorded. The temperature in all transfer lines were controlled.

Static mixer reactor (SMR):

The static mixing reactor consisted of three modules that were 11½" long by 1½" in diameter, contained Sulzer SMX mixing elements and were approximately 350 mL in volume. Valves were placed between each module for sampling. Each module had an external heating jacket with two ports to flow hot oil through and were connected to its own heating/circulating oil baths to provide individual temperature control. Batch (syrup) temperatures were measured at the inlet and outlet of each module and recorded. The temperature in all transfer lines was controlled. The entire reactor was made from stainless steel.

Plug flow reactors:

The plug flow reactors each consisted of three modules 6.3 inches in length and 2.1 inches in diameter and were bolted together through flanges. The total volume of each the reactors was about 1.0 L. Each reactor module had an external heating jacket with two ports to flow hot oil through and were connected to its own heating/circulating oil baths to provide individual temperature control. The top of the reactor was removable and equipped for mechanical agitation. A drive shaft passed through a seal in the top of the reactor. One end of the drive shaft was attachable to an electric motor and the other end was attachable to an agitator. Different agitator designs were used and are specified in each example. Batch (syrup) temperature were measured at the inlet and outlet of each reactor module and recorded. The temperature in all transfer lines was controlled. The entire reactor was made from stainless steel.

Laboratory scale reactor train (type-I):

The feed solution was fed from a dissolving tank to a gear pump which delivered the feed solution to the bottom inlet port of the static mixer reactor. The syrup exited the static mixer reactor through the top outlet port and was delivered to the bottom inlet port of the type I controlled shear device. The syrup exited the top outlet port of the type I controlled shear device and was collected for analysis or advancement.

Laboratory scale reactor train (type-II):

The feed solution was fed from a dissolving tank to a gear pump which delivered the feed solution to a CSTR. The CSTR was operated at a low solids level with a stable non-particulated rubber-like composite phase, as shown by the Test for Particulation described below. The syrup exiting the bottom port of the CSTR and entered a second gear pump and was delivered to the bottom inlet port of the static mixer reactor. The syrup exited the static mixer reactor through the top outlet port and was delivered to the bottom inlet port of the type I controlled shear device. The syrup exited the top outlet port of the type I controlled shear device and was collected for analysis or advancement.

The syrup that exited the static mixer reactor was past the normal inversion point and was considered to be in a metastable state with a continuous or co-continuous rubber-like composite phase as shown by the Test for Particulation, below.

Laboratory scale reactor train (type-III):

The feed solution was fed from a dissolving tank to a gear pump which delivered the feed solution to the bottom inlet port of a plug flow reactor. The syrup exited the plug flow reactor through the top outlet port and was delivered to the bottom inlet port of the type II controlled shear device. The syrup exited the top outlet port of the type II controlled shear device and was collected for analysis or advancement.

Laboratory scale reactor train (type IV):

The feed solution was fed from a dissolving tank to a gear pump which delivered the feed solution to the bottom inlet port of the first plug flow reactor. The syrup exited the first plug flow reactor through the top outlet port and was delivered to the bottom inlet port of the second plug flow reactor. The syrup exited the second plug flow reactor through the top outlet port and was delivered to the bottom inlet port of the type II controlled shear device. The syrup exited the top outlet port of the type II controlled shear device and was collected for analysis or advancement.

Polymerizations:

Using one of the above reactor trains a series of experiments were carried out. Styrene containing between 4 and 8 weight % of a medium cis or high cis rubber was polymerized by thermal or 0.028% t-butylperoxyacetate initiation. Samples of the resulting syrup were taken after the CSTR (when used), each module of the static mixer reactor (when used), one or both plug flow reactors (when used) and after the controlled shear devices. The syrup samples analyzed as is or were advanced at 140° C. for 24 hours and then devolatilized at 220° C. for 30 minutes in a vacuum oven under reduced pressure (~5 mm Hg). The resulting samples of rubber modified polystyrene then subjected to analysis. For mechanical testing the devolatilized polymer was pelletized and molded in a standard ASTM test piece mold.

Test for Particulation:

Three tenths of a gram of a devolatilized HIPS resin is shaken in 15 mL of 2-butanone (MEK) and inspected for visible gel particles. A well particulated HIPS resin will appear as a milk like suspension, while a non-particulated HIPS resin (one with a co- or continuous rubber phase) will appear as a single gel particle in a clear solution. "Partially particulated" HIPS resins are ones that fall between these two extremes.

Measurement of Swelling Index and Gel Content:

Approximately one gram of polymer is accurately weighed and dissolved in 40 mL toluene and centrifuged at 17,000 rpm, at −7° C., for two hours. The supernatant liquid is decanted, 40 mL of fresh toluene is added to the precipitated gel, and the mixture treated in an ultrasonic bath for two hours. The sample is then centrifuged at 17,000 rpm and −7° C. for two hours. The supernatant liquid is decanted. The wet gel is weighed and then dried and weighed again. The swelling index is calculated by dividing the wet gel weight by the dry gel weight, and the gel level is calculated by dividing the dry gel level by the initial sample weight.

Particle Size Measurement:

An Horiba photosedimentometer was used for particle size analysis. A typical procedure involves dispersing enough HIPS resin such that the starting absorbance of the instrument lies between 0.75 and 0.85, in 10 mL of MEK. The sample is inspected for complete dispersion and is measured immediately in centrifugal mode. The machine reports area median. The output was fitted to a log normal distribution, where appropriate, to calculate the appropriate values for the characterization of the particle size distribution.

Transmission Electron Microscopy (TEM) and Dispersed Phase Volume Fraction Analysis (DPVF):

TEM were taken of selected samples using routine methods.

Syrup Solids:

Syrup solids were determined using gravimetric analysis by devolatilizing the sample at high temperature (220° C.) and reduced pressure (5 mm Hg).

The following examples will illustrate the application of the present invention.

EXAMPLE 1

The feed syrup comprised 4% high cis polybutadiene and 0.028% t-butylperoxyacetate in styrene. The syrup was fed at a rate of 440 mL/hr into the type I reactor train and was initiated. The jackets of the static mixer reactor (SMR) were operated in increasing temperature 126°, 126°, and 131° C. and the particulator jacket was maintained at 120° C. The 0.125 inch wall clearance spindle was used in the particulator and was operated at various RPM.

The results of the example are set forth in Table I.

TABLE I

| RESULTS OF EXAMPLE I | | | |
| --- | --- | --- | --- |
| Reactor | Syrup Solids (%) | Spindle RPM | Volume Average Diameter (μM) |
| Exit of SMR | 19.10 | | Metastable Syrup |
| Particulator | 22.04 | 5 | Partially Particulated |
| Particulator | 19.18 | 10 | 5.38 |
| Particulator | 24.89 | 20 | 2.54 |
| Particulator | 21.98 | 40 | 2.06 |
| Particulator | 22.53 | 80 | 1.72 |
| Particulator | 20.40 | 160 | 2.27 |
| Particulator | 18.99 | 260 | 1.81 |

EXAMPLE 2

The feed syrup comprised 8% medium cis polybutadiene in styrene. The syrup was fed at a rate of 448 mL/hr into the type I reactor train and was thermally initiated. The 0.125 inch wall clearance spindle was used in the particulator and was operated at various RPM.

The results of the example are set forth in Table II.

TABLE II

RESULTS OF EXAMPLE 2

| Reactor | Syrup Solids (%) | Spindle RPM | Volume Average Diameter (μM) |
|---|---|---|---|
| Particulator | 30.26 | 40 | 9.20 |
| Particulator | 36.61 | 80 | 5.97 |
| Particulator | 37.04 | 160 | 4.66 |
| Particulator | 27.73 | 260 | 2.58 |

EXAMPLE 3

The feed syrup comprised 4% high cis polybutadiene and 0.028% t-butylperoxyacetate in styrene. The syrup was fed at a rate of 876 mL/hr into the type II reactor train and was initiated. The jacket temperatures were operated as follows: CSTR=120° C., SMR=118, 118 and 120° C., in order of increasing temperature and the particulator=120° C. The 0.0625 inch wall clearance spindle was used in the particulator and was operated at various RPM.

The results of the example are set forth in Table III.

TABLE III

RESULTS OF EXAMPLE 3

| Reactor | Syrup Solids (%) | Spindle RPM | Volume Average Diameter (μM) |
|---|---|---|---|
| Exit of SMR | 20.96 | Metastable Syrup | |
| Particulator | 21.85 | 20 | 3.32 |
| Particulator | 22.02 | 40 | 2.73 |
| Particulator | 21.61 | 80 | 1.72 |
| Particulator | 21.91 | 160 | 0.94 |
| Particulator | 22.05 | 260 | 0.66 |

EXAMPLE 4

The feed syrup comprised 8% medium cis polybutadiene and 0.028% t-butylperoxyacetate in styrene. The syrup was fed at a rate of 876 mL/hr into the type II reactor train and was initiated. The jacket temperatures were operated as follows: CSTR=120° C., SMR=123°, 123° and 125° C., in order of increasing temperature and the particulator=120° C. The 0.0625 inch wall clearance spindle was used in the particulator and was operated at various RPM.

The results of the example are set forth in Table IV.

TABLE IV

RESULTS OF EXAMPLE 4

| Reactor | Syrup Solids (%) | Spindle RPM | Volume Average Diameter (μM) |
|---|---|---|---|
| Exit of SMR | 29.40 | Metastable Syrup | |
| Particulator | 29.95 | 10 | 3.80 |
| Particulator | 30.17 | 20 | 2.75 |
| Particulator | 31.27 | 40 | 2.67 |
| Particulator | 30.82 | 80 | 2.22 |
| Particulator | 31.06 | 160 | 1.99 |
| Particulator | 30.60 | 260 | 1.55 |

The above data demonstrate that it is possible to control particle size distribution using the process of the present invention. More specifically the data within each table show syrups which had the same chemical composition and essentially similar conversions can be particulated to produce a different particle size distribution. Additionally the results show that metastable syrups can be particulated by the process of the present invention. The data illustrates that the process is useful with various types of rubber, at various levels of rubber and different types of initiation.

EXAMPLE 5

A styrene feed solution containing 4.25 weight % of medium cis polybutadiene, 0.028 weight % of t-butylperoxyacetate and 0.5 weight % of mineral oil was polymerized in the previously described type II polymerization apparatus. The syrup exited the Couette shear field generating device at 22% solids. The wall clearance in the device was 0.06250 inch and the rotor was operated at 20 RPM. The samples in accordance with the present invention were then advanced to a high solids (>95%), devolatilized and pelletized, as described previously. Test specimens were then prepared from the experimental resin and were compared to a standard commercial resin of comparable formulation prepared using conventional polymerization technology. The tests and the results are set forth in table V.

TABLE V

| TEST | CONVENTION PROCESS | PROCESS OF THE INVENTION |
|---|---|---|
| MELT FLOW INDEX (g/10 min) | 3.1 | 1.6 |
| ORIENTATION % | 39 | 42 |
| IZOD (ft-lb/in.) | 0.80 | 1.29 |
| TENSILE YIELD (PSI) | 5740 | 4870 |
| TENSILE FAIL (PSI) | 5600 | 5610 |
| ELONGATION % | 22 | 42 |

The samples were then subjected to instrumented impact testing to measure the peak load, the energy to break, and the total energy. The results are set forth in table VI.

TABLE VI

| TEST | CONVENTIONAL PROCESS | PROCESS OF THE INVENTION |
|---|---|---|
| PEAK LOAD (lb) | 169.4 | 193.5 |
| ENERGY TO PEAK (in/lb) | 38.7 | 43.8 |
| TOTAL ENERGY (in/lb) | 64.5 | 82.1 |

It was also noted subjectively, that the test samples prepared from the resin prepared in accordance with the present invention had improved translucency over the samples prepared form resin prepared in accordance with the prior art. This is a most interesting observation as it shows that it is possible using the process of the present invention to improve both toughness and transparency, which was not considered possible using the processes of the prior art.

The above data shows that the process of the present invention is able to expand the range of properties of an impact modified resin beyond that currently available under the present art.

EXAMPLE 6

The feed syrup comprised 8% medium cis polybutadiene in styrene. The syrup was fed at a rate of 435 mL/hr into the type III reactor train and was thermally initiated. The jackets of the plug flow reactor (SPFR-1) and the particulator were all maintained at 125° C. An anchor agitator with a 0.125 inch wall clearance was used in SPFR-1 and was operated at 20 RPM. The 0.125 inch wall clearance spindle was used in the particulator and was operated at various RPM. The volume average particle diameter was measured for the syrup leaving SPFR-1 and leaving the particulator after sufficient volume had flowed through the particulator after a change in rotor speed to ensure the new particle size distribution was obtained.

The results of the example are set forth in Table VII.

TABLE VII

RESULTS OF EXAMPLE 6

| Reactor | Agitator/ Spindle RPM | Syrup Solids % | Volume Average Diameter μM |
|---|---|---|---|
| SPFR-1 | 20 | 24.72 | 5.06 |
| Particulator | 20 | 25.58 | 3.95 |
| Particulator | 30 | 24.43 | 2.47 |
| Particulator | 40 | 25.16 | 2.07 |
| Particulator | 80 | 26.94 | 1.34 |

EXAMPLE 7

The feed syrup comprised 8% medium cis polybutadiene in styrene. The syrup was fed at a rate of 250 mL/hr into the type III reactor train and was thermally initiated. The jackets of the plug flow reactor (SPFR-1) and the particulator were all maintained at 125° C. An anchor agitator with a 0.125 inch wall clearance was used in SPFR-1 and was operated at 20 RPM. The 0.125 inch wall clearance spindle was used in the particulator and was operated at various RPM. The volume average particle diameter was measured for the syrup leaving SPFR-1 and leaving the particulator after sufficient volume had flowed through the particulator after a change in rotor speed to ensure the new particle size distribution was obtained.

The results of the example are set forth in Table VIII.

TABLE VIII

RESULTS OF EXAMPLE 7

| Reactor | Agitator/ Spindle RPM | Syrup Solids % | Volume Average Diameter μM |
|---|---|---|---|
| SPFR-1 | 20 | 37.93 | 6.01 |
| Particulator | 30 | 38.23 | 4.50 |
| Particulator | 60 | 38.04 | 2.91 |
| Particulator | 90 | 39.18 | 2.23 |
| Particulator | 120 | 38.78 | 2.03 |
| Particulator | 240 | 38.74 | 1.59 |

EXAMPLE 8

The feed syrup comprised 8% medium cis polybutadiene in styrene. The syrup was fed at a rate of 435 mL/hr into the type III reactor train and was thermally initiated. The jackets of the plug flow reactor (SPFR-1) and the particulator were all maintained at 130° C. An anchor agitator with a 0.250 inch wall clearance was used in SPFR-1 and was operated at 30 RPM. The 0.125 inch wall clearance spindle was used in the particulator and was operated at various RPM. The volume average particle diameter was measured for the syrup leaving SPFR-1 and leaving the particulator after sufficient volume had flowed through the particulator after a change in rotor speed to ensure the new particle size distribution was obtained.

The results of the example are set forth in Table IX.

TABLE IX

RESULTS OF EXAMPLE 8

| Reactor | Agitator/ Spindle RPM | Syrup Solids % | Volume Average Diameter μM |
|---|---|---|---|
| SPFR-1 | 30 | 45.43 | 7.41 |
| Particulator | 30 | 49.45 | 5.26 |
| Particulator | 60 | 48.53 | 2.03 |
| Particulator | 90 | 51.31 | 2.39 |
| Particulator | 120 | 49.19 | 2.28 |
| Particulator | 200 | 50.07 | 1.61 |

EXAMPLE 9

The feed syrup comprised 8% medium cis polybutadiene in styrene. The syrup was fed at a rate of 435 mL/hr into the type III reactor train and was thermally initiated. The jackets of the plug flow reactor (SPFR-1) and the particulator were all maintained at 130° C. An anchor agitator with a 0.250 inch wall clearance was used in SPFR-1 and was operated at 40 RPM. The 0.125 inch wall clearance spindle was used in the particulator and was operated at various RPM. The volume average particle diameter was measured for the syrup leaving SPFR-1 and leaving the particulator after sufficient volume had flowed through the particulator after a change in rotor speed to ensure the new particle size distribution was obtained.

The results of the example are set forth in Table X.

TABLE X

RESULTS OF EXAMPLE 9

| Reactor | Agitator/ Spindle RPM | Syrup Solids % | Volume Average Diameter μM |
|---|---|---|---|
| SPFR-1 | 40 | 47.74 | 6.36 |
| Particulator | 30 | 47.61 | 5.73 |
| Particulator | 60 | 49.78 | 4.09 |
| Particulator | 90 | 46.65 | 2.24 |
| Particulator | 120 | 46.82 | 3.43 |
| Particulator | 240 | 47.05 | 2.77 |

EXAMPLE 10

The feed syrup comprised 8% of medium cis polybutadiene and 0.5% of mineral oil in styrene. The syrup was fed at a rate of 435 mL/hr into the type IV reactor train and was thermally initiated. The jackets of the first plug flow reactor (SPFR-1) and second plug flow reactor (SPFR-2) were operated in increasing temperature as follows 120°, 122°, 124°, 126°, and 128° C. The jacket of the particulator was maintained at 120° C. An anchor agitator with 0.250 inch wall clearance was used in SPFR-1 and was operated at 30 RPM. In SPFR-2 an agitator with alternating rods and mounted pitched slotted baffles was used and was operated at 15 RPM. The 0.125 inch wall clearance spindle was used in the particulator and was operated at various RPM. Additionally, material obtained from the particulator when the spindle was operated at 60 RPM was molded into test specimens to determine the physical properties of the sample.

The results of the particle sizing aspect of the example are set forth in table XI.

TABLE XI

THE RESULTS OF THE PARTICLE SIZING ASPECT OF THE EXAMPLE

| Reactor | Agitator/ Spindle RPM | Syrup Solids % | Volume Average Diameter μM |
|---|---|---|---|
| SPFR-1 | 30 | 25.67 | 7.02 |
| SPFR-2 | 15 | 48.10 | 5.01 |
| Particulator | 30 | 48.7 | 2.37 |
| Particulator | 60 | 48.7 | 1.66 |
| Particulator | 90 | 48.7 | 1.38 |
| Particulator | 150 | 48.7 | 1.30 |

The results of the physical tests upon the specimens of resin obtained from the experiment when the particulator was operated at 60 RPM are set forth in table XII.

TABLE XII

PHYSICAL PROPERTIES OF SAMPLES

| Test | Test Method | Result |
|---|---|---|
| Izod Impact (Ft-lbs/in.) | ASTM D256 | 3.3 |
| Tensile Yield (PSI) | ASTM D638 | 5134 |
| Tensile Fail (PSI) | ASTM D638 | 4316 |
| Modulus (KPSI) | ASTM D638 | 327 |
| Melt Flow Index (g/10 min) | ASTM D1238 | 1.02 |
| Gloss (60°) | ASTM D523 | 64.8 |

Of the samples of commercially available high impact polystyrene applicants are aware of the best balance of properties are an izod in the range from about 2.5 to about 3 ft-lbs/in. and a gloss from about 50 to 70%. The present example demonstrates that the present invention provides a simple effective process to obtain a broader balance of properties.

EXAMPLE 11

The feed syrup comprised 8% of medium cis polybutadiene and 0.5% of mineral oil in styrene. The syrup was fed at a rate of 435 mL/hr into the type IV reactor train and was thermally initiated. The jackets of the first plug flow reactor (SPFR-1) and second plug flow reactor (SPFR-2) were operated in increasing temperature as follows 120°, 122°, 124°, 128°, 130° and 132° C. The jacket of the particulator was maintained at 120° C. An agitator with alternating rods and mounted pitched slotted baffles was used in SPFR-1 and was operated at 30 RPM. In SPFR-2 two stationary baffle plates were used to break the reactor into three chambers and an agitator with mounted rods was used and was operated at 15 RPM. The 0.125 inch wall clearance spindle was used in the particulator and was operated at various RPM.

The results of the example are set forth in table XIII.

TABLE XIII

RESULTS OF EXAMPLE 11

| Reactor | Agitator/ Spindle RPM | Syrup Solids % | Volume Average Diameter μM |
|---|---|---|---|
| SPFR-1 | 30 | 25.143 | 5.67 |
| SPFR-2 | 15 | 54.64 | 5.12 |
| Particulator | 15 | 59.96 | 3.92 |
| Particulator | 30 | 57.44 | 2.30 |
| Particulator | 60 | 56.04 | 1.68 |
| Particulator | 90 | 57.12 | 1.41 |

EXAMPLE 12

The feed syrup comprised 8% of medium cis polybutadiene and 0.028% of t-butylperoxyacetate in styrene. The syrup was fed at a rate of 435 mL/hr into the type IV reactor train and was initiated. The jackets of the first plug flow reactor (SPFR-1) and second plug flow reactor (SPFR-2) were operated in increasing temperature as follows 107°, 109°, 111°, 112°, 114° and 116° C. The jacket of the particulator was maintained at 120° C. An agitator with alternating rods and mounted pitched slotted baffles was used in SPFR-1 and was operated at 15 RPM. In SPFR-2 two stationary baffle plates were used to break the reactor into three chambers and an agitator with mounted rods was used and was operated at 15 RPM. The 0.125 inch wall clearance spindle was used in the particulator and was operated at various RPM.

The results of the example are set forth in table XIV.

TABLE XIV

RESULTS OF EXAMPLE 12

| Reactor | Agitator/ Spindle RPM | Syrup Solids % | Volume Average Diameter μM |
|---|---|---|---|
| SPFR-1 | 15 | 22.02 | 9.02 |
| SPFR-2 | 15 | 44.48 | 5.72 |
| Particulator | 15 | 46.18 | 4.84 |
| Particulator | 30 | 46.18 | 3.08 |
| Particulator | 60 | 45.61 | 2.31 |
| Particulator | 90 | 46.02 | 2.25 |

EXAMPLE 13

The feed syrup comprised 8% of medium cis polybutadiene in styrene. The syrup was fed at a rate of 869 mL/hr into the type IV reactor train and was thermally initiated. The jackets of the first plug flow reactor (SPFR-1) and second plug flow reactor (SPFR-2) were operated in increasing temperature as follows 128°, 130°, 132°, 128°, 130° and 132° C. The jacket of the particulator was maintained at 120° C. An agitator with alternating rods and mounted pitched slotted baffles was used in SPFR-1 and was operated at 30 RPM. In SPFR-2 two stationary baffle plates were used to break the reactor into three chambers and an agitator with mounted rods was used and was operated at 20 RPM. The 0.125 inch wall clearance spindle was used in the particulator and was operated at various RPM.

The results of the example are set forth in table XV.

TABLE XV

RESULTS OF EXAMPLE 13

| Reactor | Agitator/ Spindle RPM | Syrup Solids % | Volume Average Diameter μM |
|---|---|---|---|
| SPFR-1 | 30 | 26.53 | 7.95 |
| SPFR-2 | 20 | 38.13 | 6.01 |
| Particulator | 15 | 37.87 | 4.74 |
| Particulator | 30 | 37.52 | 4.31 |
| Particulator | 60 | 38.04 | 2.66 |
| Particulator | 90 | 40.41 | 2.13 |
| Particulator | 150 | 39.49 | 1.85 |

The above data demonstrate that it is possible to control particle size distribution using the process of the present invention. More specifically the data within each table of examples 6 to 13 shows particulated syrups which had essentially the same chemical composition and essentially similar conversions can be treated in the uniform shear field generating device (particulator) to produce a different particle size distribution.

Overall, the above data shows that the process of the present invention is able to expand the range of properties of an impact modified resin beyond that currently available under the present art.

What is claimed is:

1. An apparatus comprising in sequential and cooperating arrangement:
   (i) one or more initial reactors suitable for the bulk polymerization of a syrup comprising one or more monomers having dissolved therein one or more rubbers, said one or more reactors being selected from the group consisting of low shear continuous stirred tank reactors and plug flow reactors;
   (ii) one or more uniform shear field devices located downstream from said one or more initial reactors to receive at least a portion of said syrup which has been polymerized to from 4 to 95% conversion, said one or more uniform shear field devices having a volume of less than 10% of the volume of said one or more initial reactors and comprising:
      (a) a chamber having a circular cross section perpendicular to its longitudinal axis comprising two ends and therebetween a continuous wall, at least one input port, at least one output port, and a ratio of length to diameter from 0.5:1 to 3:1;
      (b) a closed cylinder within and occupying substantially the volume of said chamber, said cylinder having a circular cross section perpendicular to its longitudinal axis, a continuous side wall whose surface closely conforms to the continuous wall of said chamber, except for a closely controlled clearance between the surface of the continuous wall of said chamber and the surface of the side wall of the cylinder, the ratio of the radius of the chamber to the radius of the cylinder being from 1:0.999 to 1:0.875; and
      (c) means for rotating at least one of said cylinder and said chamber relative to each other;
   (iii) one or more downstream reactors cooperating with said one or more uniform shear field devices to receive syrup from said one or more uniform shear field devices, said one or more downstream reactors being selected from the group consisting of low shear continuous stirred tank reactors and plug flow reactors.

2. The apparatus according to claim 1, further comprising downstream of said one or more downstream reactors one or more devolatilizers.

3. The apparatus according to claim 2, further comprising downstream of said one or more devolatilizers one or more pelletizers.

4. The apparatus according to claim 2, wherein said one or more initial reactors are plug flow reactors.

5. The apparatus according to claim 2, wherein said one or more initial reactors are continuous stirred tank reactors.

6. The apparatus according to claim 2, wherein said one or more downstream reactors are plug flow reactors.

7. The apparatus according to claim 2, wherein said one or more down stream reactors are continuous stirred tank reactors.

8. The apparatus according to claim 4, wherein said one or more plug flow reactors have a length to diameter ratio from 5:1 to 15:1.

9. The apparatus according to claim 6, wherein said one or more plug flow reactors have a length to diameter ratio from 5:1 to 15:1.

* * * * *